United States Patent
Loehr et al.

(10) Patent No.: US 11,411,708 B2
(45) Date of Patent: Aug. 9, 2022

(54) AUTONOMOUS BANDWIDTH PART SWITCHING

(71) Applicant: Lenovo (Singapore) PTE. LTD., New Tech Park (SG)

(72) Inventors: Joachim Loehr, Wiesbaden (DE); Alexander Johann Maria Golitschek Edler von Elbwart, Darmstadt (DE); Ravi Kuchibhotla, Clarendon Hills, IL (US); Prateek Basu Mallick, Dreieich (DE)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 206 days.

(21) Appl. No.: 16/741,427

(22) Filed: Jan. 13, 2020

(65) Prior Publication Data
US 2020/0235898 A1    Jul. 23, 2020

Related U.S. Application Data

(60) Provisional application No. 62/795,872, filed on Jan. 23, 2019.

(51) Int. Cl.
*H04L 5/00* (2006.01)
*H04W 72/04* (2009.01)
(Continued)

(52) U.S. Cl.
CPC .......... *H04L 5/0098* (2013.01); *H04L 5/0092* (2013.01); *H04W 72/0413* (2013.01);
(Continued)

(58) Field of Classification Search
CPC ............... H04L 5/0098; H04L 5/0092; H04W 72/0413; H04W 72/0453; H04W 74/0808; H04W 80/02; H04W 16/14
See application file for complete search history.

(56) References Cited

U.S. PATENT DOCUMENTS 10,925,093 B2 * 2/2021 Jose ................ H04W 72/02
11,019,518 B2 * 5/2021 Babaei .............. H04W 24/10
(Continued)

FOREIGN PATENT DOCUMENTS

WO    2019/195563 A1    10/2019
WO    2020/033395 A1    2/2020

OTHER PUBLICATIONS

3GPP, "3rd Generation Partnership Project; Technical Specification Group Radio Access Network; NR; Radio Link Control (RLC) protocol specification (Release 15)", 3GPP TS 38.322 V15.4.0, Dec. 2018, pp. 1-33.
(Continued)

*Primary Examiner* — Brian T O Connor
(74) *Attorney, Agent, or Firm* — Kunzler Bean & Adamson

(57) ABSTRACT

Apparatuses, methods, and systems are disclosed for autonomous bandwidth part switching. One method includes determining that a channel parameter corresponding to an active uplink bandwidth part of a serving cell is greater than a predetermined value at a time in which the active uplink bandwidth part is a first bandwidth part. The method includes, in response to determining that the channel parameter is greater than the predetermined value, autonomously switching the active uplink bandwidth part from the first uplink bandwidth part to a second uplink bandwidth part configured for the serving cell, wherein switching the active uplink bandwidth part comprises deactivating the first uplink bandwidth part.

18 Claims, 4 Drawing Sheets

(51) Int. Cl.
*H04W 74/08* (2009.01)
*H04W 80/02* (2009.01)

(52) U.S. Cl.
CPC ... *H04W 72/0453* (2013.01); *H04W 74/0808* (2013.01); *H04W 80/02* (2013.01)

(56) References Cited

U.S. PATENT DOCUMENTS

| | | | |
|---|---|---|---|
| 11,064,549 B2* | 7/2021 | Ang | H04W 74/0833 |
| 11,071,128 B2* | 7/2021 | Ang | H04W 72/1231 |
| 2019/0037569 A1* | 1/2019 | Lee | H04W 52/48 |
| 2019/0174548 A1* | 6/2019 | Jiang | H04W 74/0816 |
| 2021/0029768 A1* | 1/2021 | Shih | H04W 74/0808 |
| 2021/0153249 A1* | 5/2021 | Li | H04B 7/0639 |
| 2021/0235495 A1* | 7/2021 | Xu | H04L 5/0092 |
| 2021/0243808 A1* | 8/2021 | Deenoo | H04B 17/309 |
| 2021/0298067 A1* | 9/2021 | Mukherjee | H04W 74/006 |
| 2022/0014337 A1* | 1/2022 | Ouchi | H04L 5/0057 |
| 2022/0039016 A1* | 2/2022 | Terry | H04W 74/0808 |
| 2022/0053346 A1* | 2/2022 | Zhang | H04L 69/40 |

OTHER PUBLICATIONS

Oppo, "BWP switching due to LBT", 3GPP TSG-RAN WG2 Meeting #104 R2-1816265, Nov. 12-16, 2018, pp. 1-4.
ZTE, "Considerations on 4-step RACH procedure for NR-U", 3GPP TSG RAN WG2 NR #104 Meeting R2-1816829, Nov. 12-16, 2018, pp. 1-6.
Ericsson, "Handling LBT failures", 3GPP TSG-RAN WG2 #104 TDoc R2-1817969, Nov. 12-16, 2018, pp. 1-3.
3GPP, "3rd Generation Partnership Project; Technical Specification Group Radio Access Network; Study on NR-based access to unlicensed spectrum (Release 16) The present" 3GPP TR 38.889 V16.0.0, Dec. 2018, pp. 1-119.
"Notification of transmittal of the international search report and the written opinion of the International searching authority or the declaration", ISA, dated May 28, 2020, pp. 1-16.

* cited by examiner

AUTONOMOUS BANDWIDTH PART SWITCHING

CROSS-REFERENCE TO RELATED APPLICATIONS

This application claims priority to U.S. Patent Application Ser. No. 62/795,872 entitled "TEMPORARY DEACTIVATION OF AN AUTONOMOUS UPLINK OF AN NR-U CELL" and filed on Jan. 23, 2019 for Joachim Loehr, which is incorporated herein by reference in its entirety.

FIELD

The subject matter disclosed herein relates generally to wireless communications and more particularly relates to autonomous bandwidth part switching.

BACKGROUND

The following abbreviations are herewith defined, at least some of which are referred to within the following description: Third Generation Partnership Project ("3GPP"), 5$^{th}$ Generation ("5G"), 5G QoS Indicator ("5QI"), Positive-Acknowledgment ("ACK"), Aggregation Level ("AL"), Access and Mobility Management Function ("AMF"), Access Point ("AP"), Access Stratum ("AS"), Autonomous Uplink ("AUL"), Beam Failure Detection ("BFD"), Beam Failure Recovery ("BFR"), Binary Phase Shift Keying ("BPSK"), Base Station ("BS"), Buffer Status Report ("BSR"), Bandwidth ("BW"), Bandwidth Part ("BWP"), Cell RNTI ("C-RNTI"), Carrier Aggregation ("CA"), Contention-Based Random Access ("CBRA"), Clear Channel Assessment ("CCA"), Common Control Channel ("CCCH"), Control Channel Element ("CCE"), Cyclic Delay Diversity ("CDD"), Code Division Multiple Access ("CDMA"), Control Element ("CE"), Contention-Free Random Access ("CFRA"), Closed-Loop ("CL"), Coordinated Multipoint ("CoMP"), Channel Occupancy Time ("COT"), Cyclic Prefix ("CP"), Cyclical Redundancy Check ("CRC"), Channel State Information ("CSI"), Channel State Information-Reference Signal ("CSI-RS"), Common Search Space ("CSS"), Control Resource Set ("CORESET"), Downlink Feedback Information ("DFI"), Discrete Fourier Transform Spread ("DFTS"), Downlink Control Information ("DCI"), Downlink ("DL"), Demodulation Reference Signal ("DMRS"), Data Radio Bearer ("DRB"), Discontinuous Reception ("DRX"), Downlink Pilot Time Slot ("DwPTS"), Enhanced Clear Channel Assessment ("eCCA"), Enhanced LAA ("eLAA"), Enhanced Mobile Broadband ("eMBB"), Evolved Node B ("eNB"), Effective Isotropic Radiated Power ("EIRP"), European Telecommunications Standards Institute ("ETSI"), Frame Based Equipment ("FBE"), Frequency Division Duplex ("FDD"), Frequency Division Multiplexing ("FDM"), Frequency Division Multiple Access ("FDMA"), Frequency Division Orthogonal Cover Code ("FD-OCC"), Frequency Range 1—sub 6 GHz frequency bands and/or 410 MHz to 7125 MHz ("FR1"), Frequency Range 2—24.25 GHz to 52.6 GHz ("FR2"), 5G Node B or Next Generation Node B ("gNB"), Global Navigation Satellite System ("GNSS"), General Packet Radio Services ("GPRS"), Guard Period ("GP"), Global Positioning System ("GPS"), Global System for Mobile Communications ("GSM"), Globally Unique Temporary UE Identifier ("GUTI"), Home AMF ("hAMF"), Hybrid Automatic Repeat Request ("HARQ"), Home Location Register ("HLR"), Handover ("HO"), Home PLMN ("HPLMN"), Home Subscriber Server ("HSS"), Identity or Identifier ("ID"), Information Element ("IE"), International Mobile Equipment Identity ("IMEI"), International Mobile Subscriber Identity ("IMSI"), International Mobile Telecommunications ("IMT"), Internet-of-Things ("IoT"), Layer 1 ("L1"), Layer 2 ("L2"), Layer 3 ("L3"), Licensed Assisted Access ("LAA"), Load Based Equipment ("LBE"), Listen-Before-Talk ("LBT"), Logical Channel ("LCH"), Logical Channel Prioritization ("LCP"), Log-Likelihood Ratio ("LLR"), Long Term Evolution ("LTE"), Multiple Access ("MA"), Medium Access Control ("MAC"), Multimedia Broadcast Multicast Services ("MBMS"), Modulation Coding Scheme ("MCS"), Master Information Block ("MIB"), Multiple Input Multiple Output ("MIMO"), Mobility Management ("MM"), Mobility Management Entity ("MME"), Mobile Network Operator ("MNO"), massive MTC ("mMTC"), Maximum Power Reduction ("MPR"), Machine Type Communication ("MTC"), Multi User Shared Access ("MUSA"), Non Access Stratum ("NAS"), Narrowband ("NB"), Negative-Acknowledgment ("NACK") or ("NAK"), New Data Indicator ("NDI"), Network Entity ("NE"), Network Function ("NF"), Non-Orthogonal Multiple Access ("NOMA"), New Radio ("NR"), NR Unlicensed ("NR-U"), Network Repository Function ("NRF"), Network Slice Instance ("NSI"), Network Slice Selection Assistance Information ("NSSAI"), Network Slice Selection Function ("NSSF"), Network Slice Selection Policy ("NSSP"), Operation and Maintenance System ("OAM"), Orthogonal Frequency Division Multiplexing ("OFDM"), Open-Loop ("OL"), Other System Information ("OSI"), Power Angular Spectrum ("PAS"), Physical Broadcast Channel ("PBCH"), Power Control ("PC"), UE to UE interface ("PC5"), Primary Cell ("PCell"), Policy Control Function ("PCF"), Physical Cell Identity ("PCI"), Physical Downlink Control Channel ("PDCCH"), Packet Data Convergence Protocol ("PDCP"), Packet Data Network Gateway ("PGW"), Physical Downlink Shared Channel ("PDSCH"), Pattern Division Multiple Access ("PDMA"), Packet Data Unit ("PDU"), Physical Hybrid ARQ Indicator Channel ("PHICH"), Power Headroom ("PH"), Power Headroom Report ("PHR"), Physical Layer ("PHY"), Public Land Mobile Network ("PLMN"), Physical Random Access Channel ("PRACH"), Physical Resource Block ("PRB"), Physical Sidelink Control Channel ("PSCCH"), Primary Secondary Cell ("PSCell"), Physical Uplink Control Channel ("PUCCH"), Physical Uplink Shared Channel ("PUSCH"), Quasi Co-Located ("QCL"), Quality of Service ("QoS"), Quadrature Phase Shift Keying ("QPSK"), Registration Area ("RA"), RA RNTI ("RA-RNTI"), Radio Access Network ("RAN"), Radio Access Technology ("RAT"), Random Access Procedure ("RACH"), Random Access Preamble Identifier ("RAPID"), Random Access Response ("RAR"), Resource Block Assignment ("RBA"), Resource Element Group ("REG"), Radio Link Control ("RLC"), RLC Acknowledged Mode ("RLC-AM"), RLC Unacknowledged Mode/Transparent Mode ("RLC-UM/TM"), Radio Link Monitoring ("RLM"), Radio Network Temporary Identifier ("RNTI"), Reference Signal ("RS"), Remaining Minimum System Information ("RMSI"), Radio Resource Control ("RRC"), Radio Resource Management ("RRM"), Resource Spread Multiple Access ("RSMA"), Reference Signal Received Power ("RSRP"), Round Trip Time ("RTT"), Receive ("RX"), Sparse Code Multiple Access ("SCMA"), Scheduling Request ("SR"), Sounding Reference Signal ("SRS"), Single Carrier Frequency Division Multiple Access ("SC-FDMA"), Secondary Cell ("SCell"), Secondary Cell Group ("SCG"), Shared Channel ("SCH"), Sub-carrier Spacing ("SCS"), Service Data Unit ("SDU"), Serving Gateway ("SGW"), System Information Block ("SIB"), SystemInformationBlockType1 ("SIB1"), SystemInformationBlockType2 ("SIB2"), Subscriber Identity/Identification Module ("SIM"), Signal-to-Interference-Plus-Noise Ratio ("SINR"), Sidelink ("SL"), Service Level Agreement ("SLA"), Sidelink Synchronization Signals ("SLSS"), Session Management Function ("SMF"), Special Cell ("SpCell"), Single Network Slice Selection Assistance Information ("S-NSSAI"), Scheduling Request ("SR"), Signaling Radio Bearer ("SRB"), Shortened TTI ("sTTI"), Synchronization Signal ("SS"), Sidelink SSB ("S-SSB"), Synchronization Signal Block ("SSB"), Supplementary Uplink ("SUL"), Subscriber Permanent Identifier ("SUPI"), Timing Advance ("TA"), Timing Alignment Timer ("TAT"), Transport Block ("TB"), Transport Block Size ("TBS"), Time-Division Duplex ("TDD"), Time Division Multiplex ("TDM"), Time Division Orthogonal Cover Code ("TD-OCC"), Transmission Power Control ("TPC"), Transmission Reception Point ("TRP"), Transmission Time Interval ("TTI"), Transmit ("TX"), Uplink Control Information ("UCI"), Unified Data Management Function ("UDM"), Unified Data Repository ("UDR"), User Entity/Equipment (Mobile Terminal) ("UE"), Uplink ("UL"), UL SCH ("UL-SCH"), Universal Mobile Telecommunications System ("UMTS"), User Plane ("UP"), UP Function ("UPF"), Uplink Pilot Time Slot ("UpPTS"), Ultra-reliability and Low-latency Communications ("URLLC"), UE Route Selection Policy ("URSP"), Vehicle-to-Vehicle ("V2V"), Visiting AMF ("vAMF"), Visiting NSSF ("vNSSF"), Visiting PLMN ("VPLMN"), and Worldwide Interoperability for Microwave Access ("WiMAX").

In certain wireless communications networks, it may be undesirable to continue to use an active bandwidth part.

BRIEF SUMMARY

Methods for autonomous bandwidth part switching are disclosed. Apparatuses and systems also perform the functions of the methods. One embodiment of a method includes determining that a channel parameter corresponding to an active uplink bandwidth part of a serving cell is greater than a predetermined value at a time in which the active uplink bandwidth part is a first bandwidth part. In some embodiments, the method includes, in response to determining that the channel parameter is greater than the predetermined value, autonomously switching the active uplink bandwidth part from the first uplink bandwidth part to a second uplink bandwidth part configured for the serving cell, wherein switching the active uplink bandwidth part comprises deactivating the first uplink bandwidth part.

One apparatus for autonomous bandwidth part switching includes a processor that: determines that a channel parameter corresponding to an active uplink bandwidth part of a serving cell is greater than a predetermined value at a time in which the active uplink bandwidth part is a first bandwidth part; and in response to determining that the channel parameter is greater than the predetermined value, autonomously switches the active uplink bandwidth part from the first uplink bandwidth part to a second uplink bandwidth part configured for the serving cell, wherein switching the active uplink bandwidth part comprises deactivating the first uplink bandwidth part.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
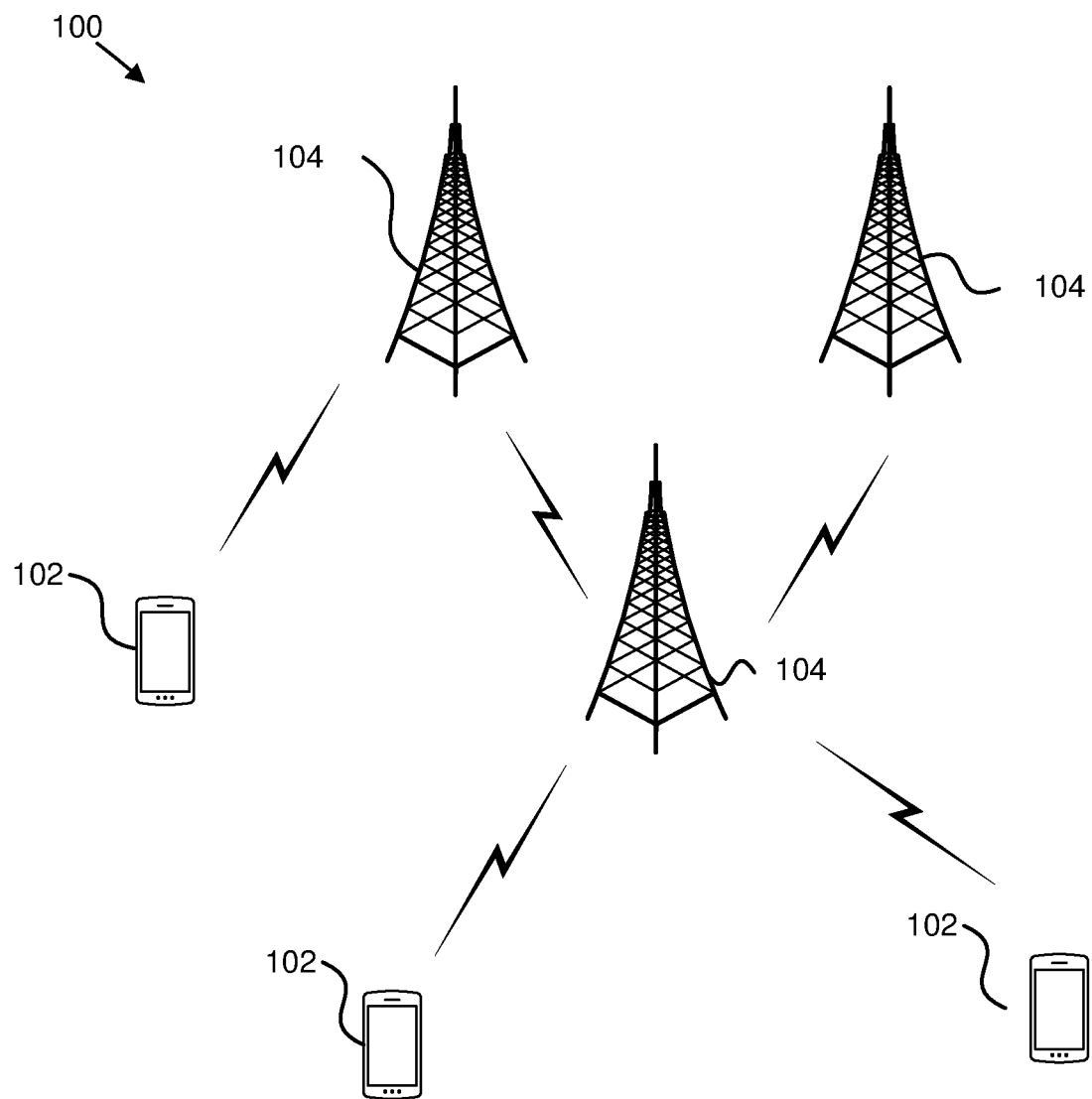
FIG. 1 is a schematic block diagram illustrating one embodiment of a wireless communication system for autonomous bandwidth part switching.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for autonomous bandwidth part switching. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to as an access point, an access terminal, a base, a base station, a Node-B, an eNB, a gNB, a Home Node-B, a relay node, a device, a core network, an aerial server, a radio access node, an AP, NR, a network entity, an AMF, a UDM, a UDR, a UDM/UDR, a PCF, a RAN, an NSSF, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in 3GPP, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, IEEE 802.11 variants, GSM, GPRS, UMTS, LTE variants, CDMA2000, Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In one embodiment, a remote unit 102 may determine that a channel parameter corresponding to an active uplink bandwidth part of a serving cell is greater than a predetermined value at a time in which the active uplink bandwidth part is a first bandwidth part. In some embodiments, the remote unit 102 may, in response to determining that the channel parameter is greater than the predetermined value, autonomously switch the active uplink bandwidth part from the first uplink bandwidth part to a second uplink bandwidth part configured for the serving cell, wherein switching the active uplink bandwidth part comprises deactivating the first uplink bandwidth part. Accordingly, the remote unit 102 may be used for autonomous bandwidth part switching.

Figure 2:
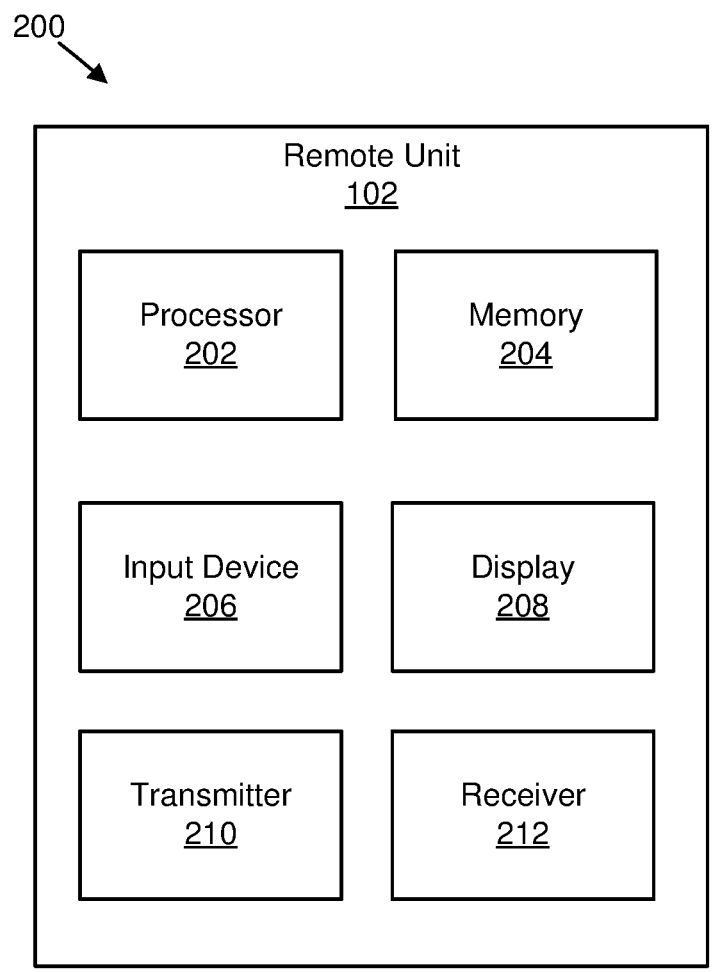
FIG. 2 is a schematic block diagram illustrating one embodiment of an apparatus that may be used for autonomous bandwidth part switching.

FIG. 2 depicts one embodiment of an apparatus 200 that may be used for autonomous bandwidth part switching. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In various embodiments, the processor 202 may: determine that a channel parameter corresponding to an active uplink bandwidth part of a serving cell is greater than a predetermined value at a time in which the active uplink bandwidth part is a first bandwidth part; and, in response to determining that the channel parameter is greater than the predetermined value, autonomously switch the active uplink bandwidth part from the first uplink bandwidth part to a second uplink bandwidth part configured for the serving cell, wherein switching the active uplink bandwidth part comprises deactivating the first uplink bandwidth part. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104, as described herein.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
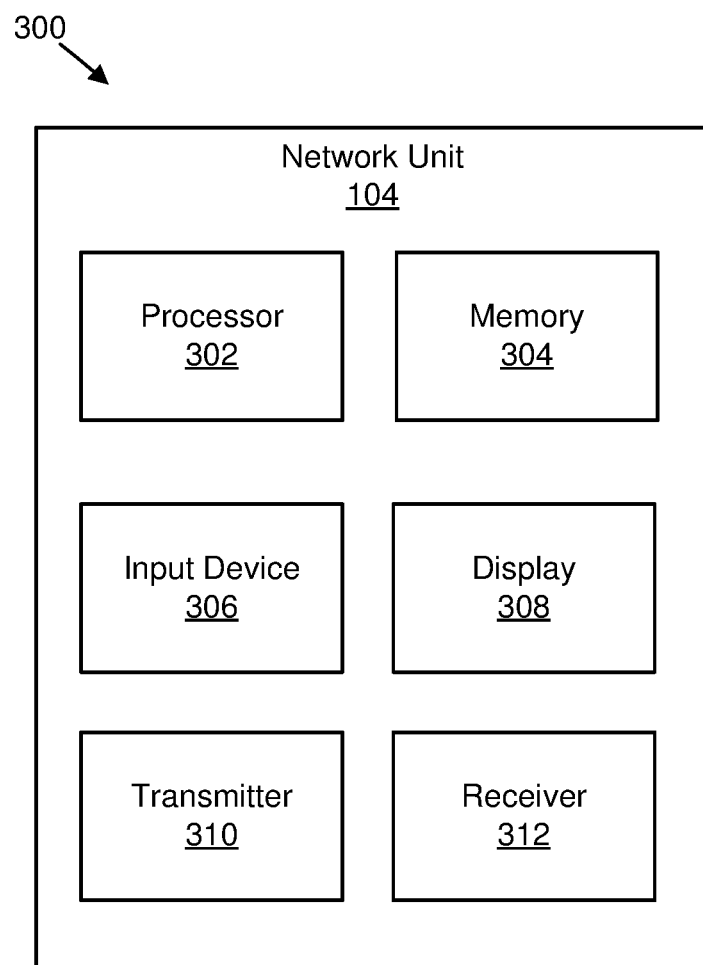
FIG. 3 is a schematic block diagram illustrating one embodiment of an apparatus that may be used for transmitting information.

FIG. 3 depicts one embodiment of an apparatus 300 that may be used for transmitting information. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In various embodiments, the transmitter 310 may transmit information. Although only one transmitter 310 and one receiver 312 are illustrated, the network unit 104 may have any suitable number of transmitters 310 and receivers 312.

The transmitter 310 and the receiver 312 may be any suitable type of transmitters and receivers. In one embodiment, the transmitter 310 and the receiver 312 may be part of a transceiver.

In certain configurations, such as for LTE eLAA, AUL transmissions may be enabled through a combination of RRC signaling and an activation message conveyed by DCI in a physical control channel. In various embodiments, an RRC configuration may include subframes in which a UE is allowed and/or enabled to transmit autonomously, and eligible HARQ process IDs. In some embodiments, an activation message may include a RBA and a MCS from which a UE may be able to determine a transport block size for any AUL transmission.

In various embodiments, it may be possible to autonomously retransmit data pertaining to a transport block that has not been received correctly by an eNB. In such embodiments, a UE may monitor DFI that may be transmitted by the eNB and may include HARQ-ACK information for AUL-enabled HARQ process IDs. In some embodiments, if a UE detects a NACK message, the UE may try to autonomously access a channel for a retransmission of the same transport block in a corresponding HARQ process. In certain embodiments, as a safe-guard against errors, an autonomous uplink transmission may include at least a HARQ process ID and an NDI accompanying a PUSCH (e.g., AUL-UCI).

In some embodiments, an eNB may transmit an uplink grant through a DCI that assigns uplink resources for a retransmission of the same transport block using a HARQ process. In various embodiments, an eNB transmits an uplink grant through a DCI that assigns uplink resources for a transmission of a new transport block using a HARQ process. In such embodiments, even though a HARQ process ID may be eligible for AUL transmissions, the eNB may still have access to this process at any time through a scheduling grant (e.g., DCI). In certain embodiments, if a UE detects a grant for an UL transmission for a subframe that is eligible for AUL (e.g., according to the RRC configuration), the UL transmission may follow the received grant and an AUL transmission may not be performed in that subframe.

In certain embodiments, unlicensed cells experiencing systematic LBT failures (e.g., high congestion) may have some negative impact on L2 procedures (e.g., LCP procedure, UL transmission procedure, PDCP routing for split bearer operation). In such embodiments, TBs may be generated for transmission on an unlicensed cell and/or PDCP data packets may be routed to unlicensed cells even though actual transmission on PHY may not occur due to a high number of LBT failures. This may negatively impact reordering delays and may be avoided.

As used herein, the term eNB and/or gNB may be used for a base station but may be replaceable by any other radio access node (e.g., BS, eNB, gNB, AP, NR, etc.). Moreover, various embodiments described herein may be described in the context of 5G NR; however, such embodiments may be equally applicable to other mobile communication systems supporting serving cells and/or carriers configured in an unlicensed spectrum LTE mobile wireless or cellular telecommunications system.

In a first embodiment, a UE may autonomously deactivate an uplink of a NR-U cell for a certain time period if the cell is experiencing a high LBT failure rate, a high CCA failure rate, and/or a high channel occupancy. LBT and/or CCA failure rate measurements (e.g., channel occupancy measurement) described herein may be performed by the UE while the UE has data it intends to transmit as well as if there is no intended transmission by the UE. In such an embodiment, the UE may still monitor a downlink of the unlicensed cell for downlink channels such as PDCCH and/or PDSCH. In one embodiment, deactivating an uplink may mean that a UE may not attempt to or perform any UL transmissions on an unlicensed cell (e.g., no PUCCH transmission, no PUSCH transmission, no SRS transmission, etc.). In one implementation of the first embodiment, the UE may still be allowed to attempt and perform a random access procedure (e.g., PRACH transmission) on the NR-U cell that is temporarily deactivated for uplink transmissions. A random access procedure may be triggered if the UE autonomously deactivates the uplink on an NR-U cell experiencing a high LBT failure rate. A predefined preamble or PRACH resource may be used to inform the gNB about the high LBT failure rate and that the UE subsequently stopped and/or deactivated the uplink.

In another implementation of the first embodiment, the UE may autonomously deactivate a current uplink BWP of an NR-U cell for a certain time period if the cell is experiencing a high LBT failure rate, a high CCA failure rate, and/or a high channel occupancy. In such an implementation, the UE may switch to the initial BWP or switch to another BWP (e.g., configured UL BWP).

In certain implementations of the first embodiment, the UE may deactivate the unlicensed cell that is experiencing a high LBT failure rate, a high CCA failure rate, and/or a high channel occupancy (e.g., uplink and downlink of the cell—if configured). In such an implementation, the UE is still able to communicate with the network node (e.g., gNB) over some other aggregated serving cell (e.g., the UE is configured for carrier aggregation or dual connectivity mode). If the UE has only one serving cell that has high congestion (e.g., a high LBT failure rate, a high CCA failure rate, and/or a high channel occupancy) or the UE's Pcell is experiencing high congestion, the UE may not disable uplink transmissions on that because no communication to the gNB in the uplink may otherwise be possible.

In some embodiments, if a certain NR-U serving cell is experiencing high congestion, a UE may not consider this congested unlicensed cell for an AUL transmission. In such embodiments, if AUL is enabled for an unlicensed cell that is experiencing high congestion, the UE may refrain from generating and transmitting a TB on that cell (e.g., the UE may autonomously release the AUL grants configured for the congested NR-U cell). It should be noted that for AUL transmissions, the UE autonomously decides to transmit a TB (e.g., upon arrival of uplink data in the buffer). In certain embodiments, if a UE keeps using an NR-U cell for uplink transmissions irrespective of high congestion, the UE may generate TBs (e.g., for AUL transmissions) that may get stuck on that congested NR-U cell for transmission. This may in turn lead to an increased reordering delay at the receiving side. It should be noted that internally routing already generated TBs to a different serving cell may not work well (e.g., due to non-matching TB sizes and other complexities). As may be appreciated, in the first embodiment, a MAC layer may be aware of whether a serving cell is experiencing high congestion. This may be ensured by UE internal communication (e.g., the PHY may report LBT and/or CCA failures or channel occupancy to the MAC or may notify the MAC about predefined events like LBT and/or CCA failures or channel occupancy exceeding a certain threshold).

In some embodiments, in addition to a buffer size, a UE may consider an LBT failure rate, a CCA failure rate, and/or a channel occupancy of an unlicensed cell if determining whether to perform an autonomous uplink transmission. In certain embodiments, a UE performs an autonomous uplink transmission unless there is no data available for transmission (e.g., if no data is available the UE may skip the autonomous uplink transmission). In certain embodiments of the first embodiment, the UE may consider also an LBT failure rate, a CCA failure rate, and/or channel occupancy in addition to a buffers status if determining whether to perform an AUL transmission or whether to skip an AUL transmission. If an LBT failure rate, a CCA failure rate, or a channel occupancy is too high (e.g., exceeding a preconfigured threshold), the UE may skip an AUL transmission even if there is data available for transmission.

In various implementations of the first embodiment, the UE may restrict certain logical channels for transmission on an unlicensed cell that is experiencing a high LBT failure rate, a high CCA failure rate, and/or high channel occupancy. In such implementations, only those logical channels that are delay intolerant (e.g., service may tolerate large transmission and/or reordering delay), may be mapped to a NR-U cell for which channel access may fail for a longer time. In certain embodiments, an RRC configuration for each logical channel may indicate whether a corresponding logical channel may be mapped to an NR-U cell that is experiencing high congestion. This may be done using a one bit flag. In some embodiments, only logical channels and/or bearers configured with a certain 5QI value are allowed to be mapped to an NR-U cell experiencing high congestion.

In some implementations of the first embodiment, the UE may autonomously suspend AUL configurations configured for a cell that is experiencing high congestion/high LBT failures.

In various embodiments, a gNB may configure an LBT failure rate threshold, a CCA failure rate threshold, and/or a channel occupancy threshold for an unlicensed cell. If the determined and/or measured CCA failure rate, LBT failure rate, number of LBT failures, and/or channel occupancy exceeds the threshold and/or is greater than or equal to the threshold, the UE may autonomously stop and/or suspend UL transmissions on that cell or may not perform any autonomous uplink transmission.

In a second embodiment, a UE may take into account an LBT failure rate, a CCA failure rate, or a channel occupancy of an unlicensed cell if deciding on the routing of PDCP PDUs in a transmitting PDCP entity to associated RLC entities for split bearer operation. In certain embodiments, routing is performed by PDCP for split bearers by considering a configured threshold, (e.g., ul-DataSplitThreshold). If the total amount of PDCP data volume and RLC data volume pending for initial transmission in the two associated RLC entities is equal to or larger than ul-DataSplitThreshold, a PDCP transmitting entity submits the PDCP PDU to either the primary RLC entity or the secondary RLC entity, or else the PDCP PDUs are submitted to the primary RLC entity.

In various embodiments, such as in NR-U, an impact of LBT may be considered for routing data to the different paths (e.g., primary and/or secondary RLC entity) for split bearer operation. This may be beneficial if one of the paths of the split bearer is over an unlicensed spectrum and the other path is over a licensed spectrum. If the channel conditions in the unlicensed spectrum changes (e.g., channel occupancy or probability of successful LBT and/or CCA drops to a low level, such as below a preconfigured threshold), the UE may continue to transmit by submitting the PDCP PDU only to the licensed spectrum regardless of the configured threshold. Otherwise reordering delay may be increased if data is stuck on one link which cannot be used for transmission due to high congestion. In one implementation of the second embodiment, the UE only considers serving cells for routing of PDCP PDUs in the transmitting PDCP entity that are not highly congested. If all serving cells of a cell group are highly congested, a transmitting PDCP entity may not submit PDCP PDUs to the RLC entity of the cell group. In some embodiments, a UE may temporarily deactivate and/or suspend a cell group for PDCP routing regardless of a configured threshold (e.g., even if a total amount of PDCP data volume and RLC data volume pending for initial transmission in the associated RLC entities is equal to or larger than ul-dataSplitThreshold). In certain embodiments, a UE may route PDCP PDUs to a cell group that is not deactivated and/or suspended for routing. In various embodiments, a UE may ignore a configured threshold ul-dataSplitThreshold and a configuration of a primary and/or secondary RLC entity for routing operation.

In some embodiments, a UE uses legacy routing rules (e.g., based on a configured threshold ul-dataSplitThreshold and/or RLC configurations) for cell groups for which at least one serving cell is not congested for which at least one serving cell is active for routing.

In certain implementations of the second embodiment, the UE doesn't report buffer status information for bearers of a cell group that is temporarily deactivated and/or suspended due to high congestion. For example, a PDCP transmitting entity doesn't indicate a PDCP data volume to a MAC entity for the purpose of buffer status reporting associated with a cell group temporarily deactivated and/or suspended for routing purposes (e.g., the PDCP data volume is set to zero). In some embodiments, a UE may set an RLC data volume to zero for bearers of a cell group that is temporarily deactivated and/or suspended due to high congestion.

In a third embodiment, a gNB configures a UE to indicate whether the UE is allowed to autonomously deactivate and/or suspend an unlicensed serving cell (e.g., temporarily deactivate the uplink of an unlicensed cell) if the serving cell is experiencing high congestion.

In one implementation of the third embodiment, the UE starts a timer if the serving cell is experiencing high congestion and deactivates and/or suspends the serving cell (e.g., for the purpose of UL transmission and PDCP routing) as long as the timer is running. In such an implementation, the timer may be started in a MAC layer and the serving cell may be deactivated and/or suspended if the measured and/or determined LBT failure rate and/or CCA failure rate exceeds a preconfigured threshold or if PHY indicates to the MAC layer a high LBT failure event, a high CCA failure event, a high channel occupancy, and/or another predefined case.

In certain implementations of the third embodiment, the UE autonomously deactivates and/or suspends an unlicensed serving cell (e.g., temporarily deactivate the uplink of an unlicensed cell) for UL transmission or PDCP routing as described in the first and second embodiment if the serving cell is experiencing high congestion and activates the serving cell (e.g., resumes the previously suspended uplink operations) if the channel occupancy, LBT failure rate, and/or CCA failure rate gets back to a normal level of congestion (e.g., based on an indication from PHY). High congestion and/or a normal level of congestion may be determined in a UE based on configured thresholds.

In various embodiments, a UE may inform a gNB if the UE has temporarily deactivated and/or suspended an unlicensed cell due to high congestion. An indication used to inform the gNB may be made using physical control signaling, MAC control signaling, or any higher layer signaling. The signaling may be done via a serving cell (e.g., if the UE is aggregating multiple serving cells) that is not congested. In some embodiments, the indication may be transmitted on a congested unlicensed cell by a random access procedure (e.g., using a predefined preamble and/or PRACH resource) that indicates the high congestion. Similar indications and/or signaling may be used by the UE to inform the gNB that a NR-U cell previously experiencing high congestion has returned to a normal level of congestion (e.g., a previously deactivated and/or suspended unlicensed cell has been activated and/or resumed).

Figure 4:
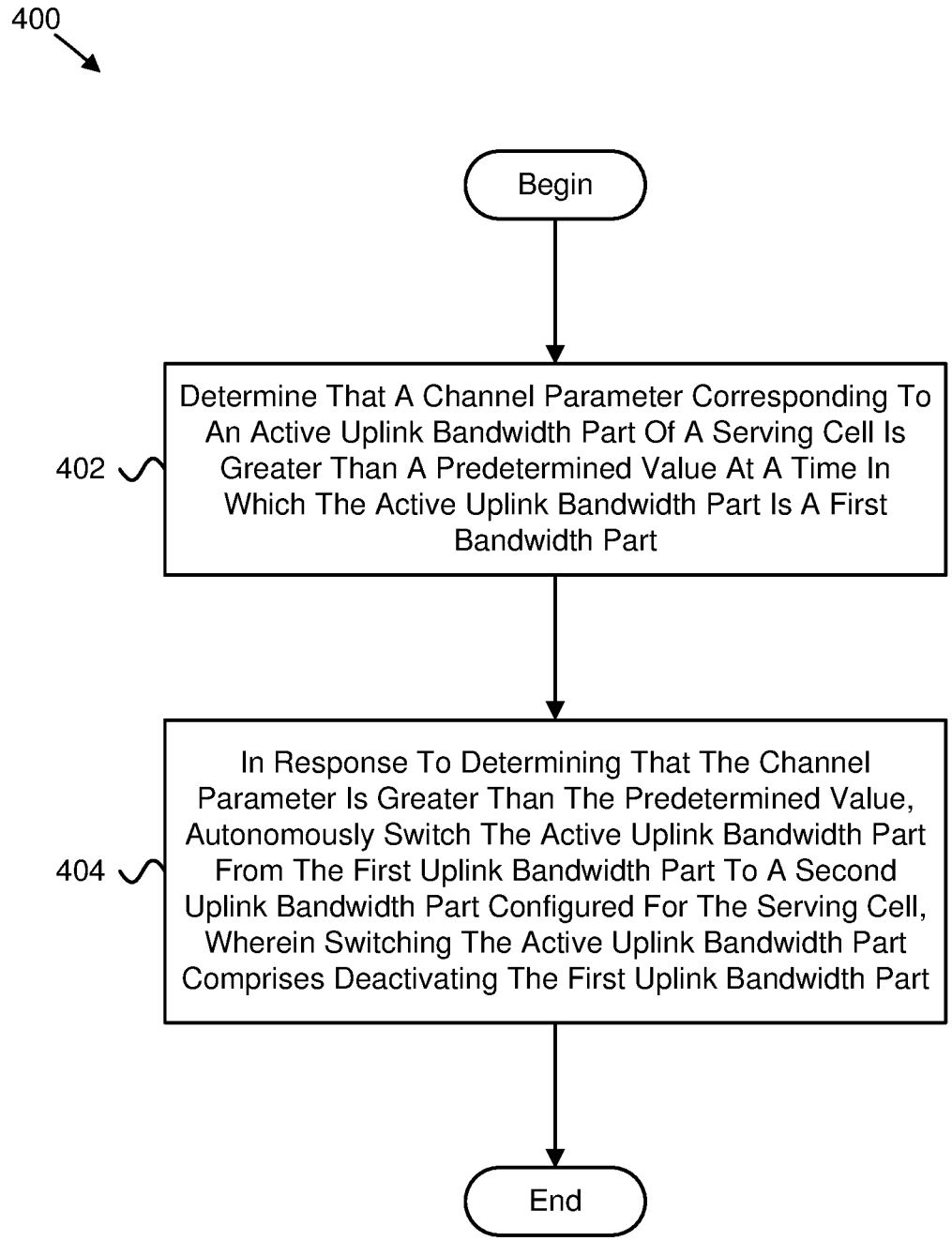
FIG. 4 is a flow chart diagram illustrating one embodiment of a method for autonomous bandwidth part switching.

FIG. 4 is a flow chart diagram illustrating one embodiment of a method 400 for autonomous bandwidth part switching. In some embodiments, the method 400 is performed by an apparatus, such as the remote unit 102. In certain embodiments, the method 400 may be performed by a processor executing program code, for example, a microcontroller, a microprocessor, a CPU, a GPU, an auxiliary processing unit, a FPGA, or the like.

The method 400 may include determining 402 that a channel parameter corresponding to an active uplink bandwidth part of a serving cell is greater than a predetermined value at a time in which the active uplink bandwidth part is a first bandwidth part. In some embodiments, the method 400 includes, in response to determining that the channel parameter is greater than the predetermined value, autonomously switching 404 the active uplink bandwidth part from the first uplink bandwidth part to a second uplink bandwidth part configured for the serving cell, wherein switching the active uplink bandwidth part comprises deactivating the first uplink bandwidth part.

In certain embodiments, the channel parameter comprises a measure of listen before talk failures. In some embodiments, the predetermined value is configured by a network entity. In various embodiments, the method 400 further comprises performing a random access procedure in response to autonomously switching the active uplink bandwidth part.

In one embodiment, the method 400 further comprises receiving information enabling autonomous switching of the active uplink bandwidth part. In certain embodiments, the method 400 further comprises autonomously suspending configured uplink grants corresponding to the active uplink bandwidth part of the serving cell in response to determining that the channel parameter is greater than the predetermined value. In some embodiments, autonomously suspending the configured uplink grants corresponding to the active uplink bandwidth part of the serving cell comprises suspending the configured uplink grants corresponding to the active uplink bandwidth part without receiving instructions from a network device indicating to suspend the configured uplink grants.

In various embodiments, deactivating the first uplink bandwidth part comprises deactivating the first uplink bandwidth part without receiving instructions from a network device indicating to deactivate the first uplink bandwidth part. In one embodiment, the first uplink bandwidth part and the second uplink bandwidth part correspond to an unlicensed cell. In certain embodiments, the method 400 further comprises transmitting information indicating that the channel parameter corresponding to the active uplink bandwidth part of the serving cell is greater than the predetermined value.

In some embodiments, the information is transmitted via a non-congested serving cell. In various embodiments, the information is transmitted via physical control signaling, medium access control signaling, or high layer signaling.

In one embodiment, a method comprises: determining that a channel parameter corresponding to an active uplink bandwidth part of a serving cell is greater than a predetermined value at a time in which the active uplink bandwidth part is a first bandwidth part; and in response to determining that the channel parameter is greater than the predetermined value, autonomously switching the active uplink bandwidth part from the first uplink bandwidth part to a second uplink bandwidth part configured for the serving cell, wherein switching the active uplink bandwidth part comprises deactivating the first uplink bandwidth part.

In certain embodiments, the channel parameter comprises a measure of listen before talk failures.

In some embodiments, the predetermined value is configured by a network entity.

In various embodiments, the method further comprises performing a random access procedure in response to autonomously switching the active uplink bandwidth part.

In one embodiment, the method further comprises receiving information enabling autonomous switching of the active uplink bandwidth part.

In certain embodiments, the method further comprises autonomously suspending configured uplink grants corresponding to the active uplink bandwidth part of the serving cell in response to determining that the channel parameter is greater than the predetermined value.

In some embodiments, autonomously suspending the configured uplink grants corresponding to the active uplink bandwidth part of the serving cell comprises suspending the configured uplink grants corresponding to the active uplink bandwidth part without receiving instructions from a network device indicating to suspend the configured uplink grants.

In various embodiments, deactivating the first uplink bandwidth part comprises deactivating the first uplink bandwidth part without receiving instructions from a network device indicating to deactivate the first uplink bandwidth part.

In one embodiment, the first uplink bandwidth part and the second uplink bandwidth part correspond to an unlicensed cell.

In certain embodiments, the method further comprises transmitting information indicating that the channel parameter corresponding to the active uplink bandwidth part of the serving cell is greater than the predetermined value.

In some embodiments, the information is transmitted via a non-congested serving cell.

In various embodiments, the information is transmitted via physical control signaling, medium access control signaling, or high layer signaling.

In one embodiment, an apparatus comprises: a processor that: determines that a channel parameter corresponding to an active uplink bandwidth part of a serving cell is greater than a predetermined value at a time in which the active uplink bandwidth part is a first bandwidth part; and, in response to determining that the channel parameter is greater than the predetermined value, autonomously switches the active uplink bandwidth part from the first uplink bandwidth part to a second uplink bandwidth part configured for the serving cell, wherein switching the active uplink bandwidth part comprises deactivating the first uplink bandwidth part.

In certain embodiments, the channel parameter comprises a measure of listen before talk failures.

In some embodiments, the predetermined value is configured by a network entity.

In various embodiments, the processor performs a random access procedure in response to autonomously switching the active uplink bandwidth part.

In one embodiment, the apparatus further comprises a receiver that receives information enabling autonomous switching of the active uplink bandwidth part.

In certain embodiments, the processor autonomously suspends configured uplink grants corresponding to the active uplink bandwidth part of the serving cell in response to determining that the channel parameter is greater than the predetermined value.

In some embodiments, the processor autonomously suspending the configured uplink grants corresponding to the active uplink bandwidth part of the serving cell comprises the processor suspending the configured uplink grants corresponding to the active uplink bandwidth part without receiving instructions from a network device indicating to suspend the configured uplink grants.

In various embodiments, deactivating the first uplink bandwidth part comprises deactivating the first uplink bandwidth part without receiving instructions from a network device indicating to deactivate the first uplink bandwidth part.

In one embodiment, the first uplink bandwidth part and the second uplink bandwidth part correspond to an unlicensed cell.

In certain embodiments, the apparatus further comprises a transmitter that transmits information indicating that the channel parameter corresponding to the active uplink bandwidth part of the serving cell is greater than the predetermined value.

In some embodiments, the information is transmitted via a non-congested serving cell.

In various embodiments, the information is transmitted via physical control signaling, medium access control signaling, or high layer signaling.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method comprising:
   determining that a channel parameter corresponding to an active uplink bandwidth part of a serving cell is greater than a predetermined value at a time in which the active uplink bandwidth part is a first bandwidth part, wherein the serving cell is an unlicensed cell; and
   in response to determining that the channel parameter is greater than the predetermined value:
      autonomously switching the active uplink bandwidth part from the first uplink bandwidth part to a second uplink bandwidth part configured for the serving cell, wherein switching the active uplink bandwidth part comprises deactivating the first uplink bandwidth part;
      suspending configured uplink transmissions on the first uplink bandwidth part; and
      after suspending configured uplink transmissions on the first uplink bandwidth part, performing a random access procedure on the unlicensed cell.

2. The method of claim 1, wherein the channel parameter comprises a measure of listen before talk failures.

3. The method of claim 1, wherein the predetermined value is configured by a network entity.

4. The method of claim 1, further comprising receiving information enabling autonomous switching of the active uplink bandwidth part.

5. The method of claim 1, further comprising autonomously suspending configured uplink grants corresponding to the active uplink bandwidth part of the serving cell in response to determining that the channel parameter is greater than the predetermined value.

6. The method of claim 5, wherein autonomously suspending the configured uplink grants corresponding to the active uplink bandwidth part of the serving cell comprises suspending the configured uplink grants corresponding to the active uplink bandwidth part without receiving instructions from a network device indicating to suspend the configured uplink grants.

7. The method of claim 1, wherein deactivating the first uplink bandwidth part comprises deactivating the first uplink bandwidth part without receiving instructions from a network device indicating to deactivate the first uplink bandwidth part.

8. The method of claim 1, wherein the first uplink bandwidth part and the second uplink bandwidth part correspond to an unlicensed cell.

9. The method of claim 1, further comprising transmitting information indicating that the channel parameter corresponding to the active uplink bandwidth part of the serving cell is greater than the predetermined value.

10. The method of claim 9, wherein the information is transmitted via a non-congested serving cell.

11. The method of claim 9, wherein the information is transmitted via physical control signaling, medium access control signaling, or high layer signaling.

12. An apparatus comprising:
a processor that:
determines that a channel parameter corresponding to an active uplink bandwidth part of a serving cell is greater than a predetermined value at a time in which the active uplink bandwidth part is a first bandwidth part, wherein the serving cell is an unlicensed cell; and
in response to determining that the channel parameter is greater than the predetermined value autonomously switches the active uplink bandwidth part from the first uplink bandwidth part to a second uplink bandwidth part configured for the serving cell, wherein switching the active uplink bandwidth part comprises deactivating the first uplink bandwidth part;
suspends configured uplink transmissions on the first uplink bandwidth part; and
after suspending configured uplink transmissions on the first uplink bandwidth part, performs a random access procedure on the unlicensed cell.

13. The apparatus of claim 12, further comprising a receiver that receives information enabling autonomous switching of the active uplink bandwidth part.

14. The apparatus of claim 12, wherein the processor autonomously suspends configured uplink grants corresponding to the active uplink bandwidth part of the serving cell in response to determining that the channel parameter is greater than the predetermined value.

15. The apparatus of claim 14, wherein the processor autonomously suspending the configured uplink grants corresponding to the active uplink bandwidth part of the serving cell comprises the processor suspending the configured uplink grants corresponding to the active uplink bandwidth part without receiving instructions from a network device indicating to suspend the configured uplink grants.

16. The apparatus of claim 12, wherein deactivating the first uplink bandwidth part comprises deactivating the first uplink bandwidth part without receiving instructions from a network device indicating to deactivate the first uplink bandwidth part.

17. The apparatus of claim 12, further comprising a transmitter that transmits information indicating that the channel parameter corresponding to the active uplink bandwidth part of the serving cell is greater than the predetermined value.

18. The apparatus of claim 17, wherein the information is transmitted via physical control signaling, medium access control signaling, or high layer signaling.

* * * * *